United States Patent [19]

Cruz, Jr.

[11] 4,391,973
[45] Jul. 5, 1983

[54] READILY HYDRATABLE CELLULOSE AND PREPARATION THEREOF

[75] Inventor: Mamerto M. Cruz, Jr., Pennington, N.J.

[73] Assignee: Morca, Inc., Pennington, N.J.

[21] Appl. No.: 293,109

[22] Filed: Aug. 17, 1981

[51] Int. Cl.³ .............................................. C08B 1/00
[52] U.S. Cl. ..................................... 536/56; 106/203; 162/87; 162/157.6; 424/362
[58] Field of Search ...................... 536/56, 57; 162/87, 162/157 C; 106/203; 424/362

[56] References Cited

U.S. PATENT DOCUMENTS

| | | | |
|---|---|---|---|
| 1,822,416 | 9/1931 | Nonamaker | 536/56 |
| 1,964,772 | 7/1934 | Schur et al. | 536/56 |
| 2,190,274 | 2/1940 | Sheldon | 162/87 |
| 2,978,446 | 4/1961 | Battista et al. | 536/56 |
| 3,388,119 | 6/1968 | Cruz | 536/56 |
| 3,397,198 | 8/1968 | Greidinger et al. | 536/57 |
| 3,954,727 | 5/1976 | Toshkov et al. | 536/57 |
| 4,269,859 | 5/1981 | Morse | 536/56 |

OTHER PUBLICATIONS

Battista et al., "Microcrystalline Cellulose", Industrial and Engineering Chemistry, vol. 54, No. 9, pp. 20-29, Sep. 1962.

*Primary Examiner*—Ronald W. Griffin

[57] ABSTRACT

Readily hydratable cellulose products prepared by acid treatment of highly fibrillated filbrillatable cellulose precursor such as wood pulps. Highly flocculent slurries are formed when the products are mixed in water. The slurries exhibit slow settling rates and the material gradually settles, after prolonged standing, into a highly flocculent, uncompacted mass below a layer of crystal clear aqueous medium.

9 Claims, No Drawings

READILY HYDRATABLE CELLULOSE AND PREPARATION THEREOF

This invention relates to a new physical form of cellulose.

Prior to recorded history man was familiar with and made use of celluloses in the form of wood and other vegetable matter. Probably the next physical form of cellulose from a commercial or use standpoint was a paper-like product. The ancient Egyptians discovered that the stalks or stems of the papyrus plant could be beaten in water and the resulting slurried fibers could be laid down and dried to form a continuous sheet. In the 19th Century, chemists prepared various cellulose derivatives which could be spun into a different physical form, namely, continuous filaments. Early in the 20th Century, another physical form of cellulose appeared on the market, namely, a clear film (cellophane) was formed by the viscose process. Cellulose filaments and fibers (rayon), cellulose acetate filaments and fibers and cellophane continue on the market.

The next new physical form of cellulose which became a commercially produced product in the late 1950's was microcrystalline cellulose described in the Battista-Smith U.S. Pat. No. 2,978,446. About 10 years later, a colloidal form of amorphous cellulose was developed by Greidinger, Bernstein and Epstein in Israel, see U.S. Pat. No. 3,397,198.

The present invention is directed to a further physical form of cellulose and a method of producing such new physical form of cellulose.

For the production of microcrystalline cellulose, the raw material must be a form of purified cellulose, either native or regenerated cellulose. The pure cellulose is subjected to hydrolysis as by subjecting it to the action of 2.5 N hydrochloric acid at the boil (about 105° C.) at atmospheric pressure for 15 minutes. As stated in the patent, this treatment removes any non-cellulosic impurities remaining in the raw material and removes the amorphous regions of the cellulose. The recovered cellulose consists of large aggregates or bundles of crystalline cellulose. For example, where the raw material is in fibrous form, the material recovered from the hydrolysis treatment will be in the form of the fibers. The recovered fiber is in the form of a somewhat fragile skeleton of crystalline cellulose. When this residue is stirred in water, for example at a 5% weight concentration, the material settles much like fine sand as the agitation is arrested. Following recovery of the residue, the residue is subjected to an attrition treatment in an aqueous medium to break the crystalline skeletons into smaller particles. When at least about 1% of the particles have a size of 1 micron or less, and a 5% dispersion in water is formed, a thixotropic suspensoid is formed.

In producing the colloidal amorphous cellulose of Greindinger, et al, the same purified wood pulp, cotton linters or regenerated cellulose, a pure cellulose, is dissolved in strong aqueous sulfuric acid (65–75% $H_2SO_4$) at a temperature of 35°–45° C. at atmospheric pressure. The solution is then diluted with sufficient water to reduce the concentration to about 20 to 25% by weight sulfuric acid. The precipitated cellulose is completely amorphous and of a colloidal particle size and unlike the hydrolysed cellulose of the Battista, et al, method does not possess the fiber network of the raw material.

In accordance with the present invention, a very specific cellulose raw material is subjected to a hydrolysis treatment utilizing a non-derivatizing mineral acid, such as hydrochloric acid, comparable to that utilized in the preparation of microcrystalline cellulose. The resulting residue is in the form of water-insoluble, highly hydrated, floc-like particles. While the hydrolyzed purified cellulose of the Battista, et al, method when stirred in water settles much like fine sand, the recovered hydrated particles of the present invention when stirred in water form a floc-like slurry which does not settle like fine sand. The unattrited hydrolyzed purified cellulose when stirred in water settles into a compact precipitate after agitation is arrested. The material of the present method when slurried in water will gradually settle, after prolonged standing, into a highly flocculent uncompacted mass and the liquid above the mass is crystal clear indicating that no particles of colloidal size are formed. The washed amorphous cellulose product of the Greindinger, et al, method when stirred in water forms a colloidal dispersion of the particles because of their colloidal size. The product of the present invention acts much like a low D.S. carboxymethyl cellulose of Hercules Inc., Wilmington, Delaware. As stated, the present product when slurried in water and the slurry is allowed to stand for at least 24 hours forms a flocculent uncompacted mass much like the action of a slurry of the CMC, although the CMC settles into a gel-like mass in the lower portion of a column.

The cellulose raw material for the purposes of the present invention consists of natural forms of cellulose that are fibrillatable such as, for example, wood, certain tree barks, bast and leaf fibers. It is critical and essential that the fibrillatable cellulose precursor be wet mechanically beaten to effect fibrillation of the fibers prior to being subjected to the hydrolysis treatment. Preferably the precursor may be commercial forms of paper and chemical grades of pulps. One of the preferred precursor materials is a paper making grade of a mixture of soft wood and hard wood sulfate pulps. In the mixed pulp, the soft wood sulfate pulp constitutes from about 75 to 90% by weight of the mixture with the hard wood sulfate pulp constituting the balance. In the paper making art such pulps are generally referred to as mechanically refined pulps. Mechanical refining does not designate a purification treatment but rather a mechanical alteration. Purified pulps refer to pulps which have been chemically treated as by treatment with aqueous caustic soda. The pulp raw material may be unbleached or bleached, however such bleaching treatment is not a chemical hydration. The pulp may be a chemically purified pulp, however, it is essential that whether so purified or not, the pulp must be highly mechanically refined or highly beaten so as to fibrillate the fibers prior to the hydrolysis treatment. The pulps are mechanically refined (beaten) to a Schopper-Riegler (ml/SR) of about 100 to about 650, preferably 100 to 450.

The raw material may be beaten by the use of conventional paper mill beaters normally utilized for pulp refining. Representative equipment includes the Bauer disk refiner, Kollergang beater, Valley beater and the like.

A representative precursor material of this type is a highly beaten pulp such as a glassine pulp furnish, either unbleached or bleached, having ml/SR of about 150.

The fibrillated precursor, preferably in a never dried state, is treated with aqueous hydrochloric acid, such as a solution containing about 8 to 10% acid, taking into account the water associated with the pulp if in a never dried state. The wet raw material is mildly agitated in the solution at a temperature of 104°–106° C., at atmospheric pressure for 15–16 minutes. Lower acid concentrations may be utilized with increased temperature, time, and pressure. Preferably, about 5 parts by weight of the raw material (dry basis) is used to about 100 parts by weight of the acid solution. Following the reaction period, about an equal part of water at room temperature is added so as to arrest the reaction. The residue consisting of water-insoluble cellulose particles may be recovered by any suitable method for separating solids from a liquid such as filtration, centrifugation, etc. The recovered filter cake is preferably treated with dilute ammonium hydroxide, pH not over about 8, to convert residual hydrochloric acid to an ammonium salt. The cake is then subjected to water washing.

The cake may be mixed with water to form a slurry of about 10% consistency and the slurry spray dried to recover the product in a dry state. Alternatively, the water may be removed by slurrying the cake in a water-miscible organic solvent such as isopropanol or ethanol, separating a filter cake, and repeating the slurrying and separating a filter cake a sufficient number of cycles so as to reduce the water content to about 5%. The dewatered cake may then be dried in an air circulating oven at 60° C.

One of the very unique characteristics of the washed filter cake is that when a small portion of the water-wet cake is rubbed across the heel of the palm of the hand is that it creates a smooth, non-gritty sensation the same as an aqueous etherified cellulose such as low D.S. carboxymethyl cellulose. Another characteristic is that the dried powder is instantaneously hydrated when wet with water. When a small portion of the dried cake is placed on the palm of the hand, wetted with water and rubbed across the heel of the palm of the hand, the feel and sensation is identical to that created by the never dried wet cake material. Microcrystalline cellulose residue from the treatment of purified cellulose with hydrochloric acid without attrition when wet with water and rubbed on the heel of the hand gives a sensation of a mildly gritty material.

The present method is illustrated by the examples which follow:

EXAMPLE 1

The raw material consisted of a highly beaten bleached, paper grade softwood/hardwood sulfate pulp (85/15) furnish containing about 37%, by weight, dry fibers, the pulp having a Schopper-Riegler (ml/SR) of about 150. A hydrolyzing solution was prepared by diluting 72.1 gms. of 38% hydrochloric acid with water to provide about 275 gms. of solution. This aqueous hydrochloric acid was heated to its boiling point, 104°–105° C., and 40.9 gms. of the furnish was added with mild agitation (magnetic mixer). About one minute after the addition of the furnish the liquor was again boiling at 104°–105° C. The temperature and mild agitation were maintained for 14–15 minutes. The mass was then poured into an equal volume (about 300 gms.) of deionized water at room temperature. The mixture had a temperature of 50°–55° C. The mixture was filtered to recover the residue in the form of a filter cake. The filter cake was washed with deionized water to a pH of 5–6, and then washed with sufficient dilute ammonium hydroxide to a pH of 7–8. The residual hydrochloric acid is thereby converted to ammonium chloride. The filter cake is finally washed with deionized water to remove the ammonium chloride, and residual ammonium hydroxide, and to reduce the pH of the filter cake to pH 6.5–7. The filter cake was white in color. The procedure was repeated to prepare a number of such filter cakes.

Dried products were prepared by slurrying filter cakes in azeotropic isopropanol and in azeotropic ethanol, the filter cakes recovered and such treatments repeated a total of 4 cycles. The recovered filter cakes were then washed 4 times with 100% isopropanol or 100% ethanol depending upon which alkanol was used in the first washings. The filter cakes were then vacuum dried at about 60° C. The dried products were white in color.

A sufficient amount of water-wet washed filter cake was placed in a 250 ml graduate and deionized water added to form a 2% solids slurry. The graduate was manually inverted end to end twice to distribute the solids uniformly throughout the volume. Similarly, a slurry in deionized water was prepared using the dried product. The two slurries could not be distinguished from each other. Both slurries were floc-like suspensions in appearance. After about 15 minutes the floc-like materials settled in the graduates to form a clear top water layer of about 10 ml.

EXAMPLE 2

Example 1 was repeated substituting a highly beaten, unbleached, paper grade, mixed softwood/hardwood pulp furnish having a Schopper-Riegler (ml/SR) of about 165 for the furnish used in Example 1. During the acid treatment, furfural was evolved. Residues were recovered as filter cakes and washed as described in Example 1. The washed filter cakes were light brown in color. Filter cakes were also dried as described in Example 1. The dried products were a lighter brown in color as compared to the wet cakes.

Slurries of wet filter cake material and dried material were formed in 250 ml graduates as described in Example 1. Both materials formed slurries that were floc-like suspensions in appearance and of substantially the same shade of light brown. The two slurries were indistinguishable from each other and were distinguishable from the slurries of Example 1 only by the difference in color.

EXAMPLE 3

Duplicate slurries were prepared by taking samples of filter cakes of Example 1 at various stages in their processing. All slurries were prepared to contain 1.2% by weight, based on the dry weight of the cellulose residues, in deionized water. Two slurries were prepared from the original filter cakes which had been washed with deionized water. The slurries had a pH of 5. Two additional slurries were prepared from the filter cakes which had been water-washed followed by washing with dilute ammonium hydroxide. These slurries were prepared from filter cakes which had received final washing with water. These slurries had a pH of 6.5–7.

The slurries were transferred to 250 ml graduates. Each graduate was manually inverted end to end twice so as to distribute the solids uniformly throughout the volume. The rate at which the slurried solids settled at room temperature (23°–24° C.) was measured by reading at 1 hour intervals the level to which the floc-like solids had settled. The averages of the readings for each type of slurry are indicated in the following table:

TABLE I

| Time hours | Sedimentation Volume, ml. | | |
|---|---|---|---|
| | pH 5 | pH 6.5-7 | pH 7.5-8 |
| 1 | 155 | 154 | 190 |
| 2 | 112 | 126 | 170 |
| 3 | 112 | 104 | 152 |
| 4 | 95 | 94 | 130 |
| 5 | 92 | 86 | 118 |
| 6 | 92 | 80 | 114 |
| 14 | 86 | 74 | 78 | in all instances the liquid above the settled floc-like solids was crystal clear. It will be noted that the highest settling rate occurred when the slurry was at a neutral pH. The slurries at an acid pH have a slightly lower settling rate while the alkaline slurries exhibited the lowest settling rate. It will also be noted that after 14 hours, all of the slurries had settled materials were highly flocculent and uncompacted. Upon inverting the graduates end to end as in the preparation of the slurries, as noted above, the solids became uniformly distributed throughout the volume and upon standing exhibited approximately the same settling rates.

The products of the present invention are satisfactory for a wide variety of uses. A particular advantage of the product is that because of the readily hydratable characteristic of the dried particles, they may be shipped in a dry state and the floc-like slurry prepared at the site of use by a simple mixing in an aqueous liquid. The products are highly effective as viscosity-builders in such widely divergent preparations as ingredients in drilling muds and cosmetic facial mud packs. For these and other purposes where color is of no significance, the products may be prepared from the less expensive unbleached, fibrillatable cellulose precursors. For other cosmetic purposes, such as hand cleaning lotions and facial creams, the white products prepared from the bleached precursor materials are more desireable. Also, in the preparation of food products, such as puddings, for example, the products may be substituted for corn starch and other bodying agents. The products are also satisfactory as inert binders in the preparation of pharmaceutical tablets and as suspending agents in ointments and liquid preparations containing suspended solids such as milk of magnesia. The products of this invention are particularly satisfactory for the preparation of cellulose derivatives. Because of the highly reactive nature of the particles, the substitution is more uniform as compared to substituted derivatives formed from the usual fiber forms of cellulose. Cellulose derivatives of very low D.S. may be prepared which function as much higher D.S. products formed from cellulose fibers.

What is claimed is:

1. The method of producing water-insoluble cellulose particles that form floc-like slurries when mixed in water which comprises subjecting a mechanically fibrillated fibrillatable cellulose precursor to hydrolysis by the use of an aqueous solution of a non-derivatizing mineral acid and recovering water-insoluble, highly hydrated, floc-like cellulose particles.

2. The method as defined in claim 1 wherein the mechanically fibrillated, fibrillatable cellulose precursor is a wood pulp having a Schopper-Riegler (ml/SR) of between about 100 and about 650.

3. The method as defined in claim 1 wherein the mechanically fibrillated, fibrillatable cellulose precursor is a wood pulp having a Schopper-Riegler (ml/SR) of 100 to 450.

4. The method as defined in claim 1 wherein the aqueous solution of mineral acid is an 8 to 10% aqueous solution of hydrochloric acid.

5. The method as defined in claim 1 wherein the recovered water-insoluble, highly hydrated, floc-like cellulose particles are dried.

6. The method as defined in claim 1 wherein the recovered water-insoluble, highly hydrated, floc-like cellulose particles are recovered as a slurry in water.

7. As an article of manufacture, water-insoluble, non-gritty cellulose particles characterized in forming water-insoluble, highly hydrated floc-like particles when slurried in an aqueous medium, the slurries settling into highly flocculent, uncompacted masses below a layer of crystal clear aqueous medium upon prolonged standing of the slurries and further characterized in having been prepared by the method of claim 1.

8. An article of manufacture as defined in claim 7 wherein the cellulose particles are in the form of floc-like particles slurried in an aqueous solution.

9. An article of manufacture as defined in claim 7 wherein the cellulose particles are in a dry state.

* * * * *